(12) United States Patent
Uebelacker

(10) Patent No.: US 9,283,871 B2
(45) Date of Patent: Mar. 15, 2016

(54) VEHICLE SEAT AND UTILITY MOTOR VEHICLE COMPRISING A VEHICLE SEAT

(71) Applicant: GRAMMER AG, Amberg (DE)

(72) Inventor: Roland Uebelacker, Pfreimd (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/278,190

(22) Filed: May 15, 2014

(65) Prior Publication Data
US 2015/0015047 A1 Jan. 15, 2015

(30) Foreign Application Priority Data

Jun. 26, 2013 (DE) .......................... 10 2013 106 717
Sep. 20, 2013 (DE) .......................... 10 2013 110 416

(51) Int. Cl.
*B60N 2/22* (2006.01)
*B60N 2/48* (2006.01)
*B60N 2/38* (2006.01)
*B60N 2/02* (2006.01)

(52) U.S. Cl.
CPC ............ *B60N 2/2222* (2013.01); *B60N 2/2209* (2013.01); *B60N 2/38* (2013.01); *B60N 2/4867* (2013.01); *B60N 2002/0204* (2013.01); *B60N 2002/0212* (2013.01); *B60N 2002/0216* (2013.01)

(58) Field of Classification Search
CPC .. B60N 2/2222; B60N 2/4864; B60N 2/4867; B60N 2002/0216
USPC .................................. 297/353, 383, 406, 407
See application file for complete search history.

(56) References Cited

U.S. PATENT DOCUMENTS

| 769,495 | A | | 9/1904 | Schroeder |
| 937,343 | A | | 10/1909 | Wallace |
| 1,257,427 | A | | 2/1918 | Underwood |
| 2,219,799 | A | * | 10/1940 | Zuck et al. ..................... 297/407 |
| 2,306,334 | A | * | 12/1942 | Costas .......................... 297/407 |
| 2,835,311 | A | | 5/1958 | Reeves et al. |

(Continued)

FOREIGN PATENT DOCUMENTS

| AT | 321497 | 4/1975 |
| DE | 1796557 | 9/1959 |

(Continued)

OTHER PUBLICATIONS

Official Action (no English translation available) for German Patent Application No. 12194557.0, dated Jan. 29, 2015, 5 pages.

(Continued)

*Primary Examiner* — Peter Brown
(74) *Attorney, Agent, or Firm* — Sheridan Ross P.C.

(57) ABSTRACT

The invention relates to a vehicle seat, in particular a utility motor vehicle seat, having a seat part, having a backrest comprising a lower backrest part and an upper backrest part, and having a holding device, by means of which the upper backrest part is mounted displaceably with respect to the lower backrest part, wherein the holding device comprises a guide device, by means of which the upper backrest part can be linearly displaced along a displacement curve laterally past at least one side edge of the lower backrest part in such a way that the upper backrest part can also be rotated about the displacement curve and/or about a transverse axis extending in a transverse manner to the displacement curve during the lateral displacement.

11 Claims, 4 Drawing Sheets

(56) References Cited

U.S. PATENT DOCUMENTS

| | | | |
|---|---|---|---|
| 3,300,249 A | 1/1967 | Schneider | |
| 3,342,528 A | 9/1967 | Radke et al. | |
| 3,348,880 A | 10/1967 | Swann | |
| 3,393,938 A | 7/1968 | Meyer et al. | |
| 3,888,329 A | 6/1975 | Monaghan | |
| 4,108,493 A | 8/1978 | Naus | |
| 4,195,882 A | 4/1980 | Daswick | |
| 4,634,176 A | 1/1987 | Scott | |
| 4,679,854 A | 7/1987 | Putsch et al. | |
| 5,108,150 A | 4/1992 | Stas | |
| 5,154,477 A | 10/1992 | Lacy | |
| 5,211,696 A | 5/1993 | Lacy | |
| 5,308,028 A * | 5/1994 | Kornberg | 297/406 |
| 5,547,247 A | 8/1996 | Dixon | |
| 5,567,015 A | 10/1996 | Arias | |
| 5,803,542 A | 9/1998 | Insausti | |
| 6,079,784 A | 6/2000 | Peachey | |
| 6,224,149 B1 | 5/2001 | Gevaert | |
| 6,305,749 B1 | 10/2001 | O'Connor et al. | |
| 6,513,781 B1 | 2/2003 | Meyer et al. | |
| 6,648,416 B2 | 11/2003 | O'Connor et al. | |
| 6,893,095 B2 | 5/2005 | Schambre et al. | |
| 7,178,874 B2 | 2/2007 | Demski | |
| 7,210,735 B2 | 5/2007 | Lang | |
| 7,640,090 B2 * | 12/2009 | Uchida et al. | 297/408 |
| 8,998,335 B2 * | 4/2015 | Buehlmeyer et al. | 297/409 |
| 2003/0155797 A1 | 8/2003 | Amirault et al. | |
| 2003/0178880 A1 * | 9/2003 | Hannah | 297/406 |
| 2013/0134753 A1 | 5/2013 | Buehlmeyer et al. | |
| 2013/0175837 A1 | 7/2013 | Buehlmeyer et al. | |
| 2013/0181500 A1 | 7/2013 | Buehlmeyer et al. | |

FOREIGN PATENT DOCUMENTS

| | | |
|---|---|---|
| DE | 7228055 | 11/1972 |
| DE | 2551617 | 6/1977 |
| DE | 2644485 | 4/1978 |
| DE | 3046049 | 7/1982 |
| DE | 4126518 | 2/1993 |
| DE | 4215628 | 11/1993 |
| DE | 4405397 | 3/1995 |
| DE | 19937378 | 7/2000 |
| DE | 19920220 | 11/2000 |
| DE | 20307102 | 10/2003 |
| DE | 69913203 | 9/2004 |
| DE | 19628861 | 6/2005 |
| DE | 102004007043 | 6/2005 |
| DE | 102004052604 | 4/2006 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0729867 | 9/1996 |
| EP | 0972671 | 1/2000 |
| EP | 2599658 | 6/2013 |
| EP | 2599659 | 6/2013 |
| FR | 2748432 | 11/1997 |
| FR | 2895336 | 6/2007 |
| FR | 2927855 | 8/2009 |
| FR | 2929185 | 10/2009 |
| FR | 2930208 | 10/2009 |
| FR | 2932429 | 12/2009 |
| GB | 2277869 | 11/1994 |
| GB | 2453165 | 4/2009 |
| GB | 2472836 | 2/2011 |
| WO | WO 03/068556 | 8/2003 |
| WO | WO 2011/020919 | 2/2011 |

OTHER PUBLICATIONS

Examination Report for German Patent Application No. 102011055897.7, dated Jul. 25, 2014, 8 pages.
Extended European Search Report for European Patent Application No. 14163935.1, dated Oct. 30, 2014, 6 pages.
Official Action (with English translation) for Chinese Patent Application No. 2012104992473, dated Nov. 3, 2014, 13 pages.
Official Action (with English translation) for Chinese Patent Application No. 201210489228, dated Dec. 1, 2014, 29 pages.
Examination Report for German Patent Application No. 102010018822.0, dated Jan. 31, 2013, 3 pages.
Examination Report for German Patent Application No. 102011055895.0, dated Feb. 29, 2012, 3 pages.
Examination Report for German Patent Application No. 102011055895.0, dated Oct. 2, 2012, 3 pages.
Extended European Search Report for European Patent Application No. 12194405.2, mailed Feb. 8, 2013, 3 pages.
Extended European Search Report for European Patent Application No. 12194557, mailed Feb. 7, 2013, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
Official Action for U.S. Appl. No. 13/686,409 mailed Apr. 24, 2014, 12 pages.
Official Action for U.S. Appl. No. 13/686,337 mailed Apr. 24, 2014, 11 pages.
European Search Report for European Patent Application No. 14163934.4, mailed Oct. 28, 2014, 6 pages.
Official Action (no English translation available) for German Patent Application No. 102013106721.2 dated Mar. 11, 2014, 3 pages.
Official Action for U.S. Appl. No. 13/686,337, mailed Dec. 2, 2014 12 pages.
Notice of Allowance for U.S. Appl. No. 13/686,409 mailed Nov. 28, 2014, 8 pages.
Official Action for U.S. Appl. No. 13/691,055, mailed Sep. 19, 2014, 9 pages.
Official Action (no English translation available) for German Patent Application No. 102013110445.2 dated Mar. 10, 2014, 3 pages.
Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.

* cited by examiner

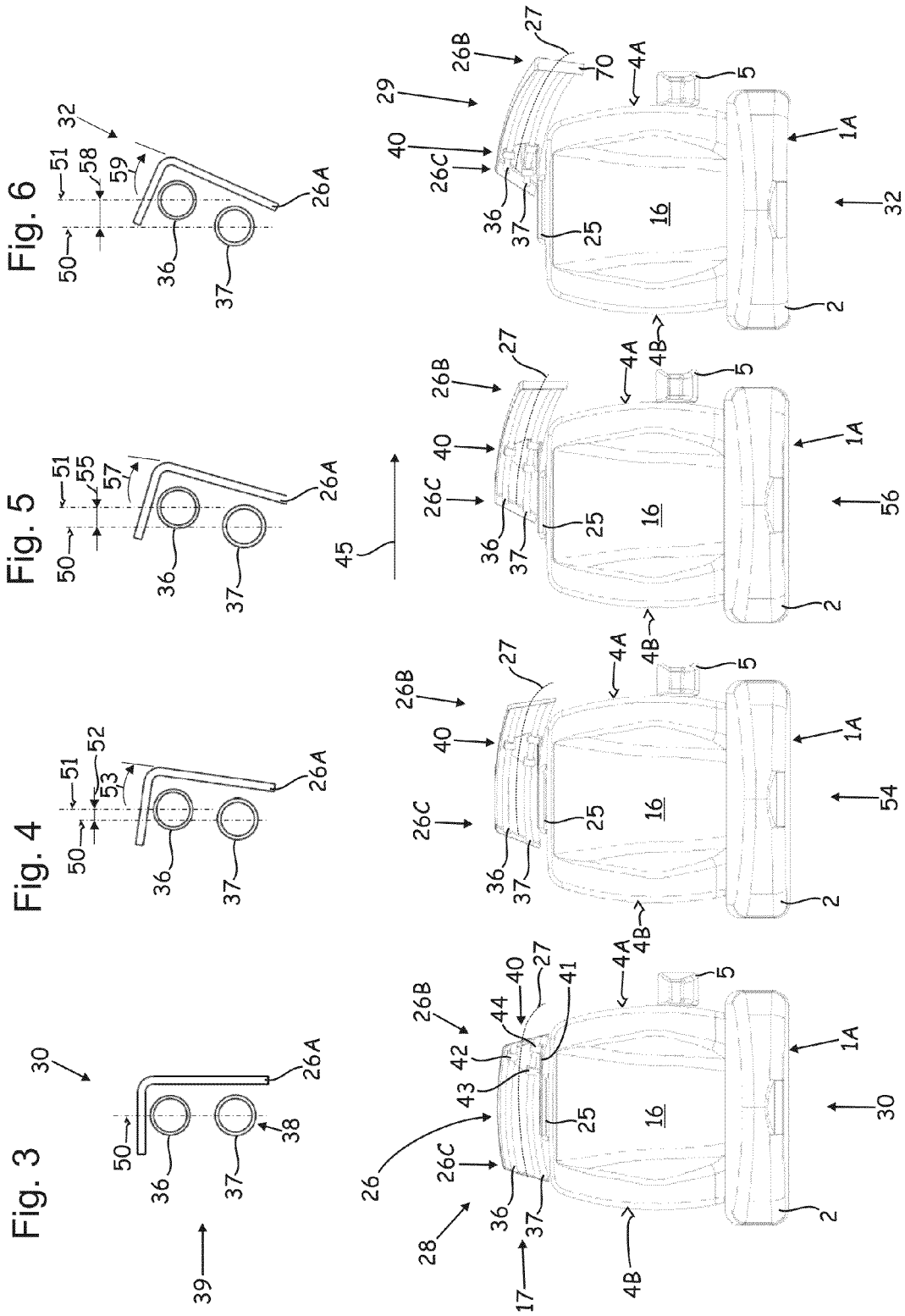

VEHICLE SEAT AND UTILITY MOTOR VEHICLE COMPRISING A VEHICLE SEAT

CROSS-REFERENCE TO RELATED APPLICATIONS

This application claims the benefit of German Patent Application No. 10 2013 106 717.4, filed Jun. 26, 2013, and German Patent Application No. 10 2013 110 416.9, filed Sep. 20, 2013, the entire disclosures of each of which are incorporated herein by reference.

BACKGROUND

The invention relates to a vehicle seat, in particular a utility motor vehicle seat, having a seat part, having a backrest comprising a lower backrest part and an upper backrest part, and having a holding device, by means of which the upper backrest part is mounted displaceably with respect to the lower backrest part.

The invention further relates to a utility motor vehicle, in particular an agricultural utility motor vehicle, comprising at least one vehicle seat.

A variety of conventional vehicle seats, in particular for utility motor vehicles and specifically for agricultural utility motor vehicles, are in various manners well-known from the state of the art.

In particular drivers of agricultural utility motor vehicles, during their work with these agricultural utility motor vehicles and the working equipment attached thereto, often take up a further, laterally or rearwardly orientated seated working posture—differing from the normal vehicle seat stance which is orientated forwards, in other words in the direction of travel—over a relatively long period, for example so as to be better able to reach and operate operating elements located at the side rear in the vehicle cabin, or else merely so as to be better able to observe working equipment which is attached behind the agricultural utility motor vehicle for a relatively long period.

So as to give the driver easier operating access to rearwardly located operating elements in this laterally or rearwardly orientated seated working posture, or merely so as to be better able to see or respectively observe a rear operating region behind a vehicle seat, Offenlegungsschrift DE 30 46 049 A1 discloses a vehicle seat in which the backrest is divided at least in two, and in this context accordingly has an upper backrest part and a lower backrest part, at least the upper backrest part being pivotable about a vertical axis. As a result, the driver can at any time turn his/her torso or respectively upper body, for example so as to reach the operating elements positioned behind the vehicle seat, since the upper backrest part can rotate about this vertical axis. In this context, the driver can indeed reach backwards past the lower backrest part without difficulty, since the upper backrest part is rotated about the vertical axis; however, with this solution the driver has very unsatisfactory support, or none at all, for his/her upper body in a corresponding laterally or rearwardly orientated seated working posture. The driver is thus not significantly supported by the upper backrest part.

In another, more recent solution, drivers can intermittently rotate the entire vehicle seat, in other words substantially the entire rigid seat construction including the seat part and the backrest, about a defined vertical axis of rotation by means of a rotation adapter, so as to be better able to reach a rear space within the vehicle cabin or respectively observe a rear space outside the vehicle cabin. In this context, the seat part remains stationary with respect to the backrest as a whole. Any accessories on the vehicle seat, for example a multifunctional armrest, thus rotate together with respect thereto. However, operating levers which are arranged further back to the side in the vehicle cabin still cannot be actuated comfortably as a result.

The latter solution further results in the driver having to turn himself/herself out of a comfortable seat cushion contour of the vehicle seat, so as in particular to be able to continue operating the pedals of the agricultural utility motor vehicle reasonably reliably. This in turn can lead to pressure points and thus to discomfort especially in the driver's buttocks and thigh region.

Specifically the back cushion contour is currently formed in such a way that the driver is supported as much as possible in the forwardly directed vehicle seat stance, without depriving him/her of the necessary degree of freedom which he/she requires for his/her movements in the driving operation. So as not to obstruct freedom of movement in the shoulder/arm region, the back cushion of the backrest must not be too contoured in the upper region. However, so as to ensure good support and thus sufficiently good load relief for the driver, a support surface should always be as large as possible in all driving positions. For the aforementioned reasons, such as the required degrees of freedom for good movement, this can currently only be achieved under some conditions and thus in an unsatisfactory manner, since the driver is alternating between two extremely different driving positions.

A further major drawback is that the possible pivot range of the rotary adapter is limited because, even when the rear operating equipment is being observed, the utility motor vehicle still has to be controlled safely via the pedals and the steering wheel. To meet these demands, the driver often has to take up a constrained posture, which inevitably leads to critical torsion of his/her whole body, over a relatively long period. Scientific studies additionally show that a constrained posture of this type can lead to damage to body structures in particular when vibrations are applied, especially if the body is not sufficiently well supported. It is further established that the load on the spinal column can be reduced significantly by good support via the backrest part.

SUMMARY

An object of the invention is to offer a driver improved seat comfort, especially when he/she has to take up a constrained posture of this type, so that he/she is able to drive an agricultural utility motor vehicle reliably and in particular in a safe manner. In addition, a further object of the invention is to protect the driver from premature fatigue when taking up this constrained posture.

The object of the invention is achieved by a vehicle seat, in particular a utility motor vehicle seat, having a seat part, having a backrest comprising a lower backrest part and an upper backrest part, and having a holding device, by means of which the upper backrest part is mounted displaceably with respect to the lower backrest part, the vehicle seat being characterised in that the holding device comprises a guide device, by means of which the upper backrest part can be laterally displaced along a displacement curve towards at least one side edge of the lower backrest part in such a way that upper backrest part can further be rotated about an axis during the lateral displacement.

Preferably, the axis can be a part or a plurality of parts of the displacement curve, so that the upper backrest part is rotated about at least a portion or a part of the displacement curve during the lateral displacement. In addition or alternatively, the upper backrest part can be rotated about a transverse axis extending in a transverse manner to the displacement curve during the lateral displacement.

In particular if a utility motor vehicle seat is equipped with a guide device of this type, it is possible for the driver to be supported particularly well in a rearwardly directed constrained posture, without the upper backrest part of the backrest blocking his/her access to operating elements located behind the vehicle seat or respectively his/her view of working equipment being towed by the utility motor vehicle.

In contrast to the solutions known from the state of the art, by means of the upper backrest part the driver's torso can now advantageously additionally be supported in the event of a laterally or rearwardly directed constrained posture, resulting in particularly advantageous relief of the driver's body structures or respectively torso structures, in such a way that premature fatigue can also be prevented and thus the efficiency of work can also be increased.

By means of the guide device according to the invention, it is possible in a constructionally particularly simple manner to shift the upper backrest part from a parked position, which is placed directly above the lower backrest part and is preferably in the centre of the backrest, and into a support position located to the side of the backrest, so as to make additional driver torso support possible there.

Herein, however, the driver torso support is achieved not only in that the upper backrest part is linearly displaceable along the displacement curve laterally past at least one of the side edges of the lower backrest part, but also in that the upper backrest part additionally further rotates about this displacement axis, causing the upper backrest part also to be inclined rearwards, meaning that in particular a support surface for the driver's torso is positioned orientated unusually well in a support region which is otherwise free from vehicle seat.

This support surface can be configured particularly well with backrest cushion parts which are correspondingly provided on the upper backrest part, these backrest cushion parts thus being linearly displaceable together with the upper backrest part.

Correspondingly, it will be appreciated that the upper backrest part, but also the lower backrest part, may each have cushion parts for cushioning the backrest as a whole, these cushion parts accordingly being arranged displaceably with respect to one another.

In addition or alternatively, the upper backrest part rotates about a transverse axis extending in a transverse manner to the longitudinal displacement axis during the lateral displacement thereof, meaning that the upper backrest part can additionally further be inclined downwards about this transverse axis with respect to the lateral extension of the upper backrest part, meaning that the support comfort for the driver can be improved even further.

The lateral extension of the upper backrest part is substantially flush with the vehicle lateral extension, when the upper backrest part is located in the parked position thereof.

The transverse axis is basically a horizontal axis which is arranged in a transverse manner to the displacement curve.

In addition or alternatively, the axis about which the upper backrest part is rotated or pivoted can also be an axis which is not transverse to at least one portion of the displacement curve. Further angles relative to a portion of the displacement curve are conceivable so that the upper backrest part rotates about this axis during the lateral displacement.

In this context, the displacement curve extends for example in a transverse manner or at any other angle to the primary seating direction inherent to the vehicle seat, the primary seating direction normally extending in the direction of the vehicle longitudinal extension. The upper backrest part can thus be displaced into a lateral region of the vehicle seat, and can thus advantageously be repositioned if necessary in such a way that the driver can turn or respectively bend his/her shoulder/arm region past the lower backrest part, where the upper backrest part was previously still arranged in the parked position thereof, and nevertheless still be supported here in the upper region of his/her back by the upper backrest part which has been displaced into the support position.

Overall, the upper backrest part is intended to be pivoted to the side relative to the lower backrest part, to lower at the same time and to also ideally pivot slightly forwards. In this case, the upper backrest part can be pivoted so far that the upper backrest part is pivoted over the side edge of the lower backrest part or that it, if it is a seat which has highly pronounced lateral cushion parts extending forwards on the lower backrest part, is displaced as far as a side edge of the lower backrest part or at least towards the side edge of the lower backrest part, and in this case is also tilted or respectively pivoted forwards. In any case, the upper backrest part is always laterally displaced and also rotated/pivoted downwards and optionally also forwards, that is to say with one end extending forwards, in such a way that the user can comfortably turn his/her upper body around towards the rear and at the same time is supported in his/her upper back region when turning around.

The displacement curve may be formed at least in sections by a physical rotary shaft component or an imaginary axis of rotation outside one or more components or an assembly.

It is thus advantageous if the displacement curve is arranged extending in a transverse manner to the primary seating direction of the vehicle seat.

Herein, the displacement curve ideally extends in the primary displacement direction in which the upper backrest part is laterally displaced past the side edge of the lower backrest part.

Within the meaning of the invention, the term "seat part" denotes the region of the vehicle seat on which the buttocks of the driver are placed. The seat part thus forms a corresponding seat surface by way of seat part cushion elements.

Accordingly, the term "backrest" describes a region of the vehicle seat on which the driver can support himself/herself, basically via his/her back, while he/she is sitting on the seat part. The backrest accordingly extends upwards past the seat part from the rear end of the seat part.

In this context, the backrest is divided into an upper backrest part and a lower backrest part, the upper backrest part being mounted linearly displaceably with respect to the lower backrest part, and thus also with respect to the seat part.

The lower backrest part is preferably arranged on the vehicle seat in a stationary manner with respect to the seat part. However, this is not absolutely compulsory. The lower backrest part thus forms a part of the backrest which is stationary with respect to the seat part.

The upper backrest part thus forms a part of the backrest which is at least laterally displaceable with respect to the seat part.

The holding device is provided for this purpose, which is ideally attached directly to the lower backrest part, so as to be able to shift the upper backrest part along an imaginary displacement curve with respect to this lower backrest part. However, with a configuration of this type of the vehicle seat, it is also possible for this holding device to be provided in another region of the backrest or respectively on a frame of the vehicle seat. Alternatively, this holding device may also be provided on the body side of the respective utility motor vehicle, so as to be able to mount the upper backrest part linearly displaceably in this manner with respect to the lower backrest part.

In any case with the present upper backrest part within the meaning of the invention, an additional driver torso support device, which can be arranged outside the seat part and the backrest, can be provided so as to support the driver in the constrained posture with respect to a laterally or rearwardly orientated seated working posture.

Accordingly, a considerable improvement in seat comfort is achieved with this upper backrest part which is guided in accordance with the invention.

On the other hand, the driver is also further protected from premature fatigue, in particular if he/she has to visually monitor the rear region of the utility motor vehicle over a long period. In this way in particular, the risk of accident is greatly reduced and work safety is thus increased.

The upper backrest part and respectively the driver torso support device incorporated thereby can be arranged temporarily at least in part in a support region, which is otherwise free from vehicle seat, at the level of the region of the upper half of the backrest and laterally off-centre from the backrest, in such a way that the driver sitting on the vehicle seat is supported laterally off-centre from the backrest at least at the level of his/her shoulder and/or ribcage region during a laterally or rearwardly orientated seated working posture, the additional driver torso support device being arranged displaceably from the parked position into an additional support position, in the support region which is otherwise free from vehicle seat, using a displacement device.

In the present case, the displacement device is the guide device and can also be a linear guide device.

Advantageously, the load on the driver can be relieved extremely well by the additional driver torso support device arranged in this manner while taking up a constrained posture, in particular the above-described laterally or rearwardly orientated seated working position. Also, the additional driver torso support device is available, although preferably only when it is required.

Otherwise, for example in a forwardly orientated driving position, the additional driver torso support device does not interfere, since it remains in the idle position or respectively original parked position thereof.

Advantageously, the additional driver torso support device and thus also the upper backrest part can be arranged in such a way that the driver sitting on the vehicle seat is supported at least at the level of his/her shoulder and/or ribcage region, laterally off-centre from the backrest, during a laterally or rearwardly orientated seated working posture.

Within the meaning of the invention, the term "additional driver torso support device" describes a device for additional torso support for the driver during a constrained posture on the vehicle seat. The constructional implementation of this additional driver torso support device can be achieved in a particularly simple manner using the upper backrest part disclosed herein, in such a way that for a constructional configuration of this type the two terms can be used synonymously.

In the present context, the term "torso" anatomically describes the central region of a human body, and the torso comprises the ribcage, the stomach, the back as well as the pelvis of the human body.

It is thus advantageous if the additional driver torso support device comprises a contact surface for the driver's back and/or shoulder region, the contact surface advantageously being shaped ergonomically so as to correspond particularly well to the anatomy of the human body. This means that the driver will accept frequent use of an additional torso support of this type. At the same time, the body of the driver is protected from injuries particularly well by a contact surface of this type, since conditions are often very rough, specifically when working in the fields with agricultural utility vehicles, and in this context the driver is grateful for any targeted torso support.

However, not only a contact surface shaped in this manner is advantageous. Rather, it is necessary to place this contact surface so that it is also correctly orientated in the space. This is possible in a surprisingly constructionally simple and particularly effective manner with the present guide device, as explained in detail in connection with the upper backrest part.

Within the meaning of the invention, the term "torso support region which is free from vehicle seat" describes a region of the vehicle seat in which permanent support devices of the vehicle seat cannot reasonably be arranged permanently, since they would have too great a disruptive effect on the driver in normal driving operation.

In this context, the present torso support region which is free from vehicle seat is positioned on the one hand substantially in the upper third of the backrest, in other words above half the height of the backrest and thus often also in the direct lateral or respectively rearward viewing region of the driver. It may further also extend above the upper third. This already means that this torso support region which is free from vehicle seat absolutely has to be kept free at least in normal forward driving operation. Accordingly, it should not be confused with a conventional support region. On the other hand, the torso support region which is free from vehicle seat within the meaning of the invention is located off-centre from the backrest. This already means that it cannot be confused with a conventional support region in which a head support is placed. This is partly because the torso support region which is free from vehicle seat is additionally arranged in front of the backrest or respectively a backrest cushion element and to the side thereof. Thus, the present torso support region which is free from vehicle seat is also provided above and to the side of the seat part of the vehicle seat.

Herein, the description "laterally or rearwardly orientated seated working posture" refers to a constrained posture of the driver in terms of an upper body rotation, so as to be better able to observe a rearward working region in particular behind the agricultural utility vehicle.

At this point, it should be noted that the present vehicle seat according to the invention can not only be used advantageously in relation to a driver. Rather, the vehicle seat according to the invention can be used in virtually any field of application in which an additional torso support is to be provided at least temporarily in the vicinity of the vehicle seat.

The additional driver torso support device can be displaced particularly stably from the parked position into the additional torso support position if the displacement device comprises means for translational displacement of the additional driver torso support device, as is the case for the present guide device with respect to the upper backrest part.

It will be appreciated that the present guide device can be produced using a wide variety of mechanisms. However, the guide device can be produced in a particularly constructionally simple manner if the guide device is configured helically at least in part.

For example, the guide device comprises one or more guide elements for this purpose, which are arranged extending helically, in other words in a screw shape, around the displacement curve, in such a way that the upper backrest part can rotate around this displacement curve in a constructionally simple manner in the case of a corresponding linear displacement.

The upper backrest part is thus advantageously mounted rotatably about the displacement curve as a function of a linear displacement in this case.

It will be appreciated that helical guide elements of this type can be constructionally implemented in various ways, so as to configure the guide device helically at least in part. For example, a guide element of this type equipped with guide grooves and/or guide webs is twisted on itself along the displacement curve.

It has been found in practical tests that the holding device and in particular the guide device thereof can absorb very large driver torso support forces if the guide device comprises two guide elements arranged above and at a distance from one another, one of the guide elements being positioned differently from the other guide element on the path of the displacement curve.

In other words, one guide element is arranged at least in part in a different position from the other guide element in the direction of the displacement curve.

In this context, the first guide element forms a first curved path and the second guide element forms a second curved path, said paths preferably being arranged at least in part with a varying axial offset from one another. The two guide elements are thus arranged in a stationary manner with respect to one another with a varying axial offset. As a result, the two curved paths are arranged in a skewed manner with respect to one another at least in regions.

Within the meaning of the invention, the term "guide elements" describes elongate elements which are mounted so as to be displaceably guided using corresponding bearing means. It is clearly also possible to provide more than two guide elements of this type, meaning that the stability of the linear guide device can be increased; however, this also correspondingly complicates the constructional complexity.

If the two guide elements, arranged above one another but at a distance, are arranged or respectively orientated with a progression of this type with respect to one another, an axial offset in relation to these two guide elements can be achieved in a constructionally particularly simple manner, meaning that the upper backrest part can be inclined about the displacement curve within the meaning of the invention during the lateral displacement.

A linear displacement of this type of the upper backrest part may for example be provided pneumatically or hydraulically using corresponding pneumatic or respectively hydraulic cylinder elements.

However, a mechanism of a particularly simple construction in relation to the guide device can be achieved if the displacement takes place manually, optionally still with the mechanical assistance of one or more spring elements.

Accordingly, a constructionally very simple variant provides that the guide device comprises sliding guide elements and/or roller guide elements, whereby the upper backrest part can be mounted on the holding device by means of a sliding bearing or a roller bearing.

Herein, within the meaning of the invention, the term "sliding guide elements" refers to elongate guide elements which are mounted on sliding bodies.

Accordingly, the term "roller guide elements" describes elongate guide elements which are mounted on rolling elements or respectively roller bearings.

It will be appreciated that there can also be a combination of sliding bearings and roller bearings in the guide device, in order for it to be possible to ensure reliable linear displacement of the upper backrest part along the displacement curve.

It will further be appreciated that corresponding sliding guide elements or respectively roller guide elements may be provided in virtually any desired configuration and arrangement on the guide device.

The present guide device can be integrated into the vehicle seat in a particularly compact construction if the guide device comprises rod and/or tube elements which are arranged inside the upper backrest part.

Ideally, these rod and/or tube elements are fully integrated into the upper backrest part; however, with a corresponding configuration they may also be arranged only partially inside the upper backrest part.

In any case, the upper backrest part can be displaced along the displacement curve by means of these rod and/or tube elements, in such a way that the upper backrest part can be displaced at least in part into the torso support region which is otherwise free from vehicle seat.

Advantageously, the rod and/or tube elements are arranged inside the upper backrest part in such a way that they are displaced together with the upper backrest part so as to configure the displacement curve at least in part. As a result, it can be ensured that during displacement the rod and/or tube elements are displaced completely, together with the upper backrest part, into the torso support region which is otherwise free from vehicle seat, in such a way that a region free from components can be created on the vehicle seat above the lower backrest part, in the upper region of the backrest.

So as to be able to guide the sliding guide elements and respectively the roller guide elements reliably, it is advantageous if the guide device comprises sliding bearing elements and/or roller bearing elements which are arranged on the lower backrest part and on which rod and/or tube elements are guided in a transverse manner or at another angle to the primary seating direction.

By means of the sliding bearing elements and respectively roller bearing elements, advantageous bearing means are produced, by means of which the rod and/or tube elements can be guided directly on the lower backrest part in a constructionally simple and compact manner.

At this point, it should be noted that sliding bearing elements or respectively roller bearing elements of this type need not necessarily be attached to the lower backrest part. Rather, with a corresponding configuration, they may also be arranged in other regions of the backrest or on a frame arranged alongside the vehicle seat or the like.

Advantageously, these sliding bearing elements and/or roller bearing elements are arranged in a stationary manner on the lower backrest part, in such a way that a particularly simple construction of a holding device configured or respectively equipped with the guide device can be implemented.

Further, an advantageous variant configuration provides that the guide device has a displacement curve which is bent at least once, preferably repeatedly.

For example, a displacement curve which is only bent once is already sufficient to displace the upper backrest part into a support position which is positioned below, above, in front of or behind the central parked position of the upper backrest part.

However, if the displacement curve is bent repeatedly, the upper backrest part can undergo a manifold change in spatial position along the displacement curve, making it possible for example to curve around obstacles or the like.

So as also for example to be able to circumvent any further obstacles which may be present on the path between the central parked position and the additional support position of the upper backrest part, it is thus advantageous if the guide device comprises a repeatedly bent displacement curve.

It will be appreciated that the present upper backrest part as a whole can only configure an upper sub-region of the backrest per se.

However, it is also possible for the upper backrest part merely to be a backrest cushion element which is linearly displaceable accordingly along a displacement curve by means of the guide device, laterally at least towards a side edge of the lower backrest part, a frame or respectively framework of the backrest being stationary in particular with respect to the seat part, in such a way that merely the backrest cushion element is displaced from the central parked position into the off-centre additional support position.

In any case, in both embodiments the upper backrest part comprises backrest cushion elements by means of which the support surface already described above can be configured.

It is further possible for the upper backrest part additionally to be subdivided in the direction of the lateral extension thereof, in such a way that the backrest part is not displaced along the displacement curve as a whole, but only a first upper backrest part half, this first upper backrest part half being spatially separated from a second upper backrest part half of the upper backrest part by a vertical gap.

In any case, a variant configuration which is no less advantageous provides that the backrest parts which extend past the backrest are equipped with backrest cushion elements which are located in front of the backrest parts in the seating direction, a first backrest cushion element being a lower backrest cushion element which is stationary with respect to the seat part in the lateral direction, and a further backrest cushion element being arranged above the first backrest cushion element in the region of the upper backrest part, the upper backrest part being configured as an additional driver torso support device which can be arranged outside the seat part and the backrest and which can temporarily be arranged at least in part in a support region which is otherwise free from vehicle seat at the level of the region of the upper backrest part and laterally off-centre from the backrest, in such a way that the driver sitting on the vehicle seat is supported laterally off-centre from the backrest at least at the level of his/her shoulder and/or ribcage region during a laterally or rearwardly directed seated working posture, the additional driver torso support device being arranged displaceably from a central parked position into an additional support position in the support region which is otherwise free from vehicle seat by means of a displacement device.

In the present case, the displacement device is the guide device, which can also be configured as a rotational guide device, as already mentioned previously.

The object of the invention is also further achieved by a utility motor vehicle, in particular by an agricultural utility motor vehicle, comprising at least one vehicle seat, in which the utility motor vehicle or respectively the agricultural utility motor vehicle is equipped with a vehicle seat in accordance with one of the features disclosed herein or respectively in accordance with one of the feature combinations disclosed herein.

If the utility motor vehicle, in particular the agricultural utility motor vehicle, comprises the vehicle seat according to the invention, additional torso support can be provided specifically for the driver during working operation, in particular when driving in fields or on other unsurfaced routes, meaning that the driver is much better protected, as is also described repeatedly in detail above.

Further advantages, aims and properties of the present invention are described by way of the appended drawings and the following description, in which a vehicle seat is illustrated and described by way of example using differently configured guide devices.

In this context, components or respectively regions of the vehicle seat which are configured with an equivalent construction in the individual drawings are denoted using like reference numerals, the components or respectively regions not necessarily being numbered and described in all of the drawings. Thus, only significantly altered components or respectively regions, in particular in terms of two possible guide devices shown by way of example, are provided with new reference numerals.

The guide device may be formed as a linear guide device and the displacement curve may be formed as a linear displacement axis.

BRIEF DESCRIPTION OF THE DRAWINGS

FIG. 3 is a first schematic detail of a first possible guide device of the upper backrest part in an initial position, in which two curved guide elements, arranged above and at a distance from one another, are mounted on holding elements;

FIG. 4 is a second schematic detail of the first possible guide device in a side position (first intermediate position) displaced laterally further out, in which the two guide elements already have a first axial offset at the level of the holding guide elements;

FIG. 5 is a further schematic detail of the first possible guide device in a side position (second intermediate position) displaced laterally even further out, in which the two guide elements have a greater axial offset at the level of the holding guide element;

FIG. 6 is a final schematic detail of the first possible guide device in an end position, in which the two guide elements have a maximum axial offset at the level of the holding guide element;

DETAILED DESCRIPTION

Figure 1A:
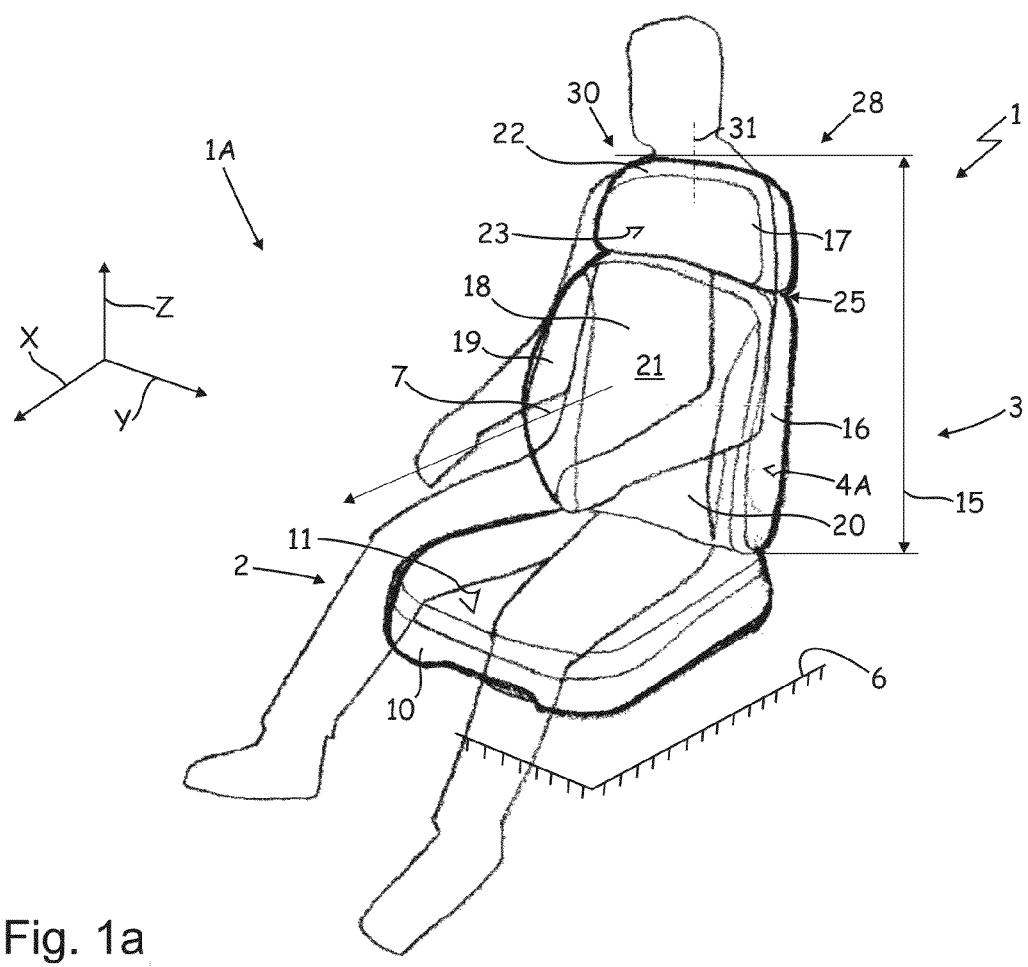
FIGS. 1a and 1b are a schematic perspective view and a schematic rear view of a utility motor vehicle seat in a normal operation condition, with a person sitting thereon, in which condition the upper backrest part is arranged in a parked position centrally above the lower backrest part.

The vehicle seat 1 shown in FIGS. 1 to 8 is a utility motor vehicle seat 1A which comprises a seat part 2 and a backrest 3, an armrest 5 further being provided on the backrest 3 at the right side edge 4A.

The seat part 2 of the utility motor vehicle seat 1A is attached to a body (not shown) of a utility motor vehicle 6 by means of a lower vehicle seat part (not shown).

The utility motor vehicle 6 defines a vehicle longitudinal extension X, a vehicle lateral extension Y and a vehicle vertical extension Z, which may also be used in relation to the orientation of the utility motor vehicle seat 1A.

Thus, using the vehicle longitudinal extension X, a position or respectively change in position "in front of" or "behind" the backrest 3 can be defined.

With the aid of the vehicle lateral extension Y, a position or respectively change in position "laterally" or respectively "to the side" with respect to the backrest 3 can be defined.

Accordingly, using the vehicle vertical extension Z, a position or respectively change in position "upwards" or respectively "downwards" with respect to the backrest 3 can also be defined.

In this context, the utility motor vehicle seat 1A is arranged in the utility motor vehicle 6 in such a way that the primary seating direction 7 of the utility motor vehicle seat 1A is substantially flush with the vehicle longitudinal extension X.

The seat part 2 comprises a seat part cushion element 10 which configures the actual seat part surface 11 of the seat part 2.

The situation is similar as regards the backrest 3, the backrest 3 being subdivided over the overall height 15 thereof into a lower backrest part 16 and an upper backrest part 17. The overall height 15 extends substantially in the direction of the vehicle vertical extension Z.

In this context, the lower backrest part 16 comprises a lower part cushion element 18 having outer cheek regions 19 and 20, in such a way that the lower backrest part 16 as a whole configures a highly contoured lower part surface 21.

Accordingly, the upper backrest part 17 comprises an upper part cushion element 22, although this configures a smooth upper part surface 23.

The utility motor vehicle seat 1A further comprises a holding device 25 (see in particular FIGS. 2a and 2b onwards), by means of which the upper backrest part 17 is mounted displaceably on the backrest 3 with respect to the lower backrest part 16.

In this context, the holding device 25 is releasably fixed in holding sockets (not shown) formed correspondingly in the lower backrest part 16 by way of holding bracket elements 25A and 25B (merely shown schematically), which are rigidly interconnected by a holding plate element 25C.

This holding device 25 configured in this manner comprises the guide device 26 according to the invention (see FIG. 3 onwards), which is configured in such a way that the upper backrest part 17 is linearly displaceable laterally along an imaginary displacement curve 27 past at least one side edge 4 of the lower backrest part 16 or respectively of the backrest 3, whilst the lower backrest part 16 is stationary with respect to the seat part 2.

The upper backrest part 17 thus forms the part of the backrest 3 which is laterally displaceable with respect to the seat part 2, whilst the lower backrest part 16 forms the part of the backrest 3 which is stationary with respect to the seat part 2.

Figure 1B:
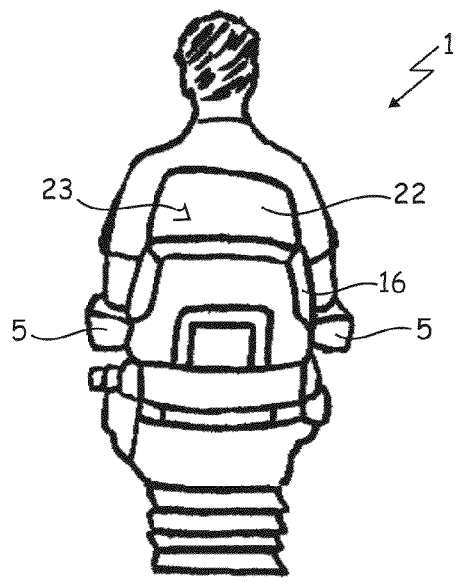
Figure 2A:
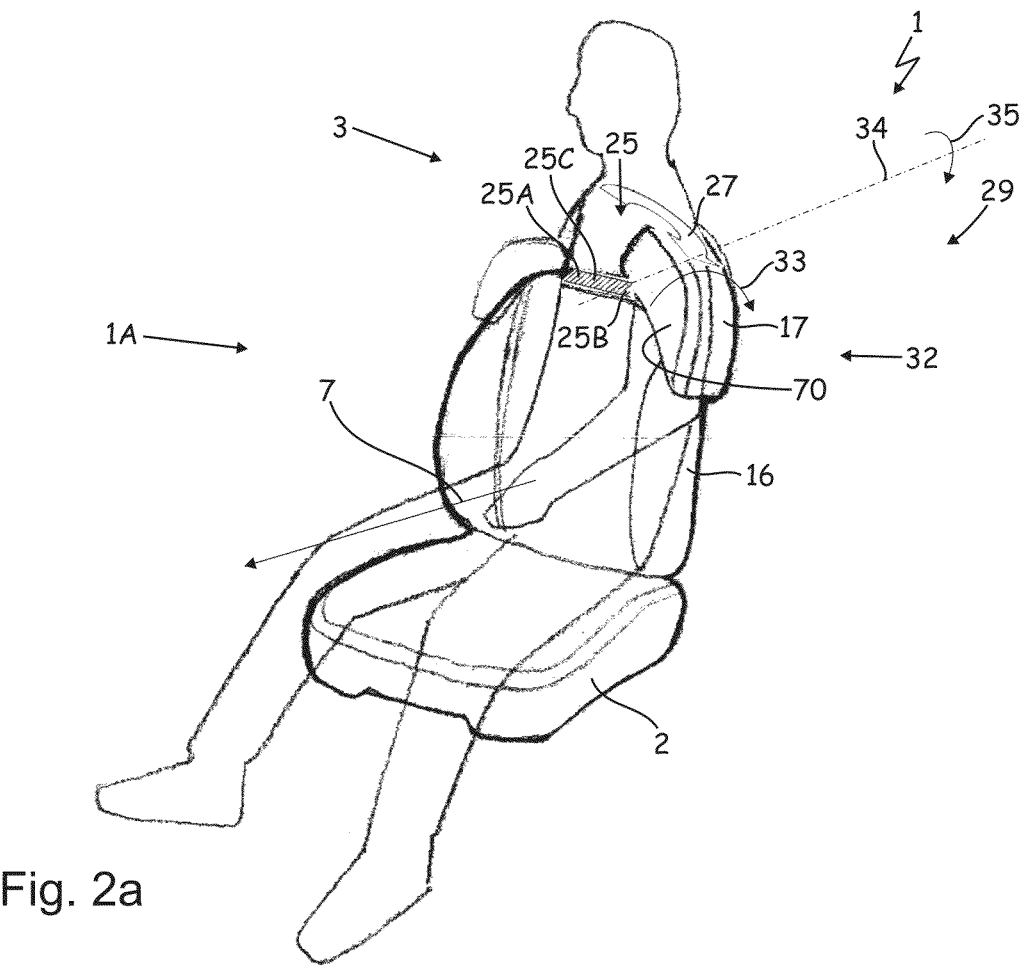
FIGS. 2a and 2b are a further schematic view and a rear view of the utility motor vehicle seat in a special support operating condition, with a person sitting thereon, in which condition the upper backrest part is arranged displaced laterally off-centre from the lower backrest part, in the sense of a driver torso support device, into a support position.
Figure 2B:
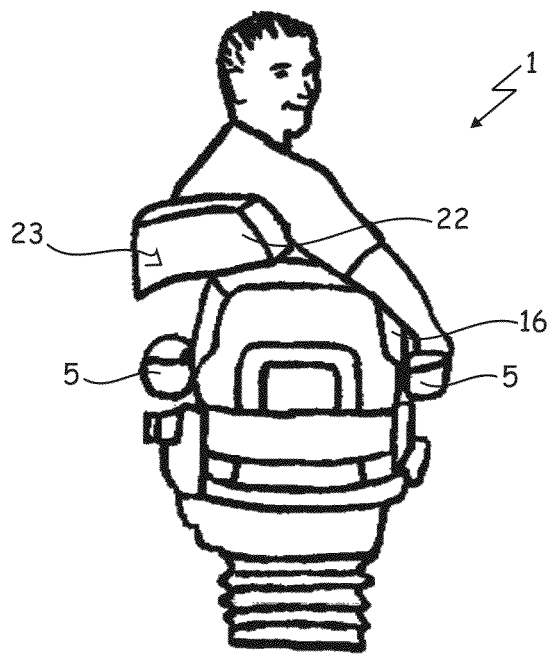

As a result, the upper backrest part 17 can be displaced or respectively slid out of a central parked position 28 (see FIGS. 1a, 1b, 3 and also 7) along the displacement curve 27 into an off-centre support position 29 (see FIGS. 2a, 2b, 6 and also 8).

Since the overall height 15 extends in the direction of the vehicle vertical extension Z, it is clear that the upper backrest part 17 is positioned completely over the lower backrest part 16, in other words above the lower backrest part 16, at least in the central parked position 28, in such a way that the driver can comfortably take his/her place on the utility motor vehicle seat 1A in the primary seating direction 7 in this normal operating condition.

In this context, the imaginary displacement curve 27 extends in a transverse manner to the primary seating direction 7 or respectively to the vehicle longitudinal extension X. The imaginary displacement curve 27 thus extends substantially in the vehicle lateral extension Y.

In the central parked position 28 of the upper backrest part 17, the guide device 26 or corresponding components thereof are located in an initial position 30 (see also FIGS. 3 and respectively 7).

This central parked position 28 and respectively this initial position 30 are defined in that, on the one hand, the upper backrest part 17 and respectively, on the other hand, the guide device 26 are located centrally with respect to a vertical central axis 31 of the backrest 3. The vertical central axis 31 extends substantially in the direction of the vehicle vertical extension Z. The central parked position 28 is thus located centrally between the two side edges 4A and 4B.

With respect to the off-centre support position 29 of the upper backrest part 17, the guide device 26 is located in a laterally off-centre end position 32 (see in particular FIGS. 2a, 2b and 6), this laterally off-centre end position 32 being located at the right side next to the vertical central axis 31 and thus also at least in part at the right side next to the right side wall 4A of the lower backrest part 16.

It will be appreciated that for a guide device 26 configured in this manner the laterally off-centre end position 32 may also be arranged to the left side of the vertical central axis 31 and thus also at least in part to the left side of the left side wall 4B of the lower backrest part 16.

In this embodiment, the guide device 26 is accommodated completely inside the upper backrest part 17 or respectively is covered at least in part by the upper backrest part 17, so it is also not explicitly shown in the drawings of FIGS. 1a, 1b and 2.

By means of the guide device 26 according to the invention, the upper backrest part 17 can not only be displaced linearly past the right side edge 4A of the lower backrest part 16, but can further also be inclined rearwards with respect to the backrest 3 or respectively downwards with respect to the backrest 3 when the upper backrest part 17 is displaced along the imaginary displacement curve 27.

In this embodiment, the upper backrest part 17 can thus additionally be rotated about the imaginary displacement curve 27 in a first inclination direction 33 and/or rotated in a second inclination direction 35 about a transverse axis 34 extending in a transverse manner to the displacement curve 27 during the lateral displacement.

So as to implement a multiply inclined change in position of the upper backrest part 17 in a constructionally simple manner, in such a way that the guide device 26 can be integrated compactly and ideally completely into the upper backrest part 17, the guide device 26 is configured helically at least in part.

In this specific first embodiment, the effect of a helically configured guide device 26 is achieved in a constructionally simple manner in that the guide device 26 comprises two guide elements 36 and 37, arranged side by side and at a distance from one another, in the form of tube elements 38 (here numbered merely by way of example), the two guide elements 36 and 37 being arranged in a skewed manner with respect to one another at least in part if they do not extend mutually parallel in sections.

In other words, one of the guide elements 36 and respectively 37 is arranged differently in the path of the displacement curve 27 with respect to the other of the guide elements 36 and 37 inside a housing element 26A of the guide device 26 (see in particular FIG. 3 onwards).

In this embodiment, the two guide elements 36 and 37 are thus arranged extending mutually parallel at a first end 26B of the guide device 26, whilst they are arranged extending in a skewed manner with respect to one another towards a second end 26C, as can be seen particularly clearly in the individual sectional drawings 39 of the respective upper partial drawings of FIGS. 3 to 6.

In this context, the two guide elements 36 and 37 define the imaginary displacement curve 27 which herein is imagined to extend between the two guide elements 36 and 37.

In this context, the guide elements 36 and 37 are configured in a curved manner in such a way that the imaginary displacement curve 27 is curved once, meaning that the upper backrest part 17 follows a curved path when it is displaced along the imaginary displacement curve 27 which is bent once.

Besides the two guide elements 36 and 37, the guide device 26 further comprises a holding device 40, which is attached to the holding device 25 of the utility motor vehicle seat 1A.

More precisely, this holding device 40 is attached to the holding plate element 25C so as to be stationary.

In this embodiment, this holding device 40 consists of a holding sheet metal element 41 configured in a delta shape, to which three holding guide elements 42, 43 and 44 are attached in turn.

In this context, the holding sheet metal element 41 configured in a delta shape is materially connected, preferably welded, to the holding plate element 25C. An equivalent connection may also alternatively be based on a screw or rivet connection or the like.

In this embodiment example, the holding device 40 is thus rigidly connected to the holding device 25. Likewise, the three holding guide elements 42, 43 and 44 are fixed to the holding sheet metal element 41 of the holding device 40 so as to be stationary. Overall, this results in robust and durable attachment of the upper backrest part 17 with respect to the lower backrest part 16.

By means of the holding sheet metal element 41 configured in a delta shape, the holding device 40 can be constructed more compactly as a whole, and it is further possible for the first guide element 36 merely to be operatively connected to the first holding guide element 42 and for the second guide element 37 to be operatively connected both to the second holding guide element 43 and to the third holding guide element 44 in such a way that the two guide elements 36 and 37 can be displaced along the imaginary displacement curve 27 in the displacement direction 45 within the holding guide element 42 or respectively 43 and 44 in accordance with the invention.

It will be appreciated that these holding guide elements 42, 43 and 44 can either be configured as sliding bearing elements and/or as roller bearing elements, which are arranged on the lower backrest part 16 by means of the holding sheet metal element 41 of the holding device 40 and the holding device 25, and on which the guide elements 36 and 37 configured as tube elements 38 are simultaneously guided in a transverse manner to the primary seating direction 7 in the direction of the imaginary displacement curve 27.

In FIG. 3, the guide device 26 is still located in the initial position 30 (cf. FIG. 1a, 1b), in which the upper backrest part 17 is located in the central parked position 28. As can be seen particularly clearly from the upper sectional drawing 39 of FIG. 3 at the height of the holding device 40, the two guide elements 36 and 37 are arranged mutually parallel jointly centrally together in a vertical plane 50 in the region of the first end 26B of the guide device 26. The upper backrest part 17 is thus not yet arranged inclined rearwards or respectively downwards within the meaning of the invention.

However, in the further progression of the two guide elements 36 and 37 towards the second end 26C of the guide device 26, the first guide element 36 is already no longer arranged centrally in the shared vertical plane 50 together with the second guide element 37, but is instead arranged centrally in a vertical parallel plane 51, in such a way that there is a first axial offset 52 between the two guide elements 36 and 37, as can be seen particularly clearly from the upper sectional drawing 39 of FIG. 4 at the height of the holding device 40.

Since the two guide elements 36 and 37 are installed fixedly in the housing element 26A, this has the effect that the upper backrest part 17 is inclined rearwards at a first angle of inclination 53 in the first inclination direction 33 (see FIGS. 2a, 2b) when the upper backrest part 17 is moved laterally along the imaginary displacement curve 27 in the displacement direction 45 (cf. FIG. 4). At the same time, in this first intermediate position 54 shown, the upper backrest part 17 is inclined downwards in the second inclination direction 35 about the transverse axis 34 as a result of the somewhat obliquely arranged holding device 40 and the curvature of the guide elements 36 and 37 (see also FIGS. 2a, 2b).

This effect is reinforced as the upper backrest part 17 is moved further towards the off-centre support position 29 thereof or respectively the guide device 26 is moved into the end position 32 thereof (see FIG. 6), since the axial offset between the two guide elements 36 and 37 constantly increases during the progression towards the second end 26C, as is illustrated particularly clearly for example in FIG. 5 with a relatively large axial offset 55.

Accordingly, in this second intermediate position 56, the first angle of inclination 53 also increases to a larger angle of inclination 57 (see sectional drawing 39, FIG. 5) and this continues until the two guide elements 36 and 37 are displaced through the corresponding holding guide elements 42, 43 and 44 to the second end 26C thereof in the displacement direction 45 and the guide device 26 is finally located in the end position 32 thereof and the upper backrest part 17 is finally located in the off-centre support position 29 thereof.

In this end position 32, a maximum axial offset 58 and accordingly a maximum angle of inclination 59 can thus be made use of so as to be able to use the upper backrest part 17 completely as an additional support surface, as a maximally slid-out and correspondingly positioned driver torso support device 70.

As soon as it has been displaced in particular completely into the off-centre support position 29 thereof (cf. FIGS. 2a, 2b and 6), the upper backrest part 17 can thus also act completely as an additional driver torso support device 70, correspondingly increasing the seat comfort of the driver.

Figure 7:
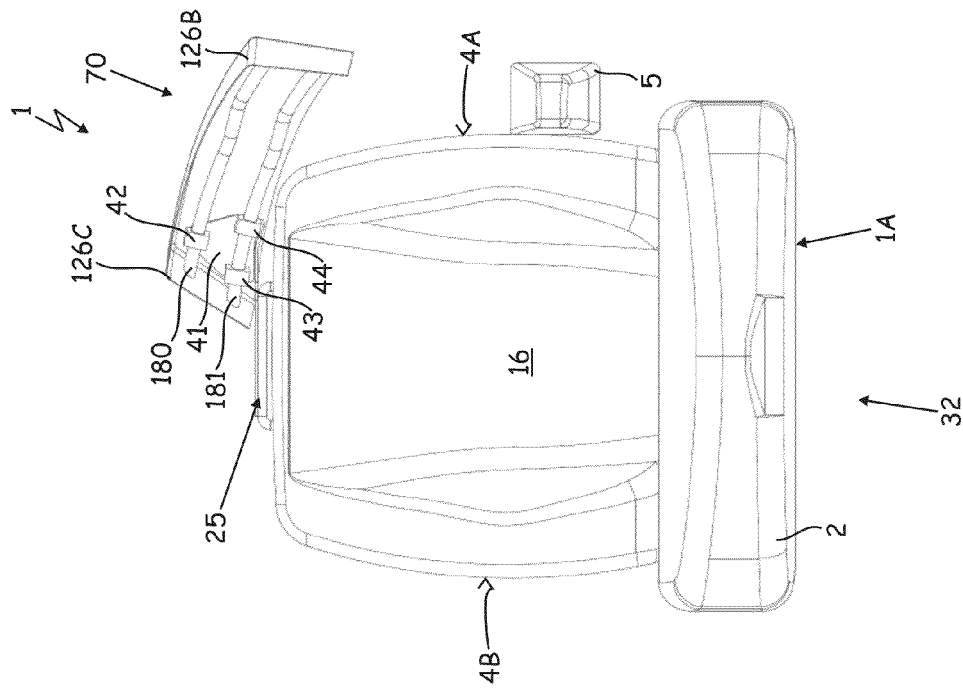
FIG. 7 is a schematic detail of a further possible guide device of the upper backrest part in an initial position, in which two guide elements, arranged above and at a distance from one another, are multiply curved.
Figure 8:
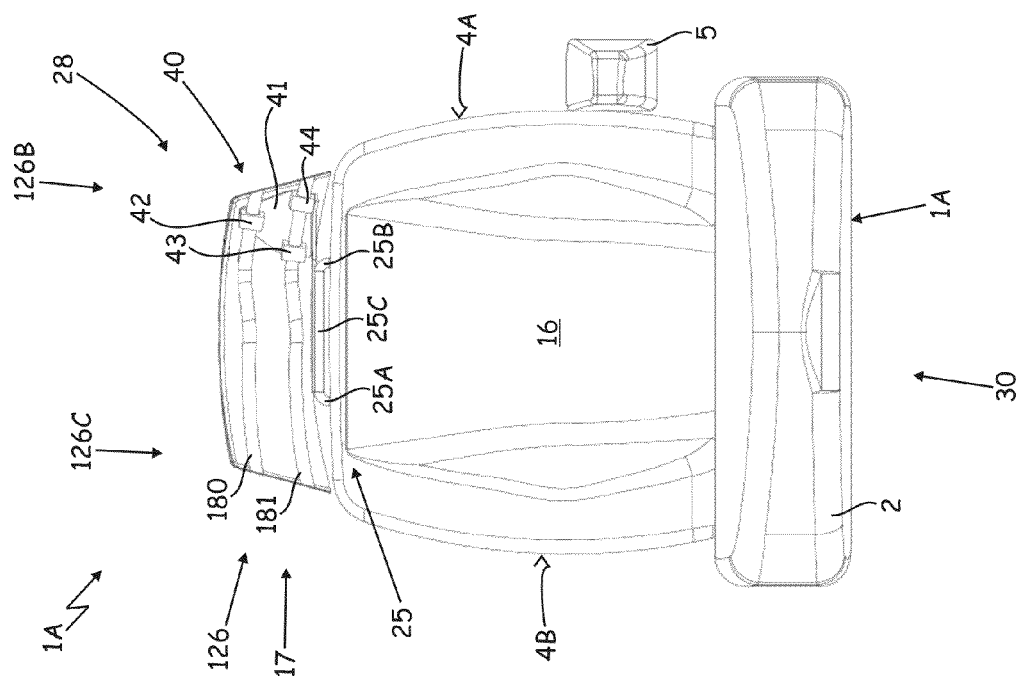
FIG. 8 is a further schematic detail of the guide device of FIG. 7 in an end position, in which the upper backrest part is located in a support position.

Whereas in relation to the first embodiment example the two guide elements 36 and 37 still have a single curvature in the form of tube elements 28 in relation to the first guide device 26 shown in detail in FIGS. 3 to 4, in this further embodiment corresponding rod elements 180 and 181 of an alternative guide device 126 shown in FIGS. 7 and 8 are multiply curved, in such a way that the upper backrest part 17 can follow a multiply curved imaginary displacement curve (not explicitly shown here). As a result, it is advantageously optionally possible for the upper backrest part 17 also to circumvent obstacles (not shown) during displacement between the central parked position 28 (see FIG. 7) and the off-centre support position 29 (see FIG. 8).

Otherwise, the utility motor vehicle seat 1A shown in FIGS. 7 and 8 corresponds to the construction described previously in FIGS. 1 and 6, and so reference is made to the relevant description for the avoidance of repetition.

It will be appreciated that the embodiments described above are merely first configurations of the vehicle seat according to the invention. The configuration of the invention is therefore not limited to these embodiments.

All of the features disclosed in the application documents are claimed as being essential to the invention if they are novel with respect to the prior art individually or in combination.

LIST OF REFERENCE NUMERALS 1 vehicle seat
1A utility vehicle seat
2 seat part
3 backrest
4 right side edge
5 armrest
6 utility motor vehicle
7 primary seating direction
10 seat part cushion element
11 seat part surface
15 overall height
16 lower backrest part
17 upper backrest part
18 lower part cushion element
19 first outer cheek region
20 second outer cheek region
21 contoured lower part surface
22 upper part cushion element
23 smooth surface
25 holding device
25A first holding bracket element
25B second holding bracket element
25C holding plate element
26 guide device
26A housing element
26B first end
26C second end
27 imaginary displacement curve
28 central parked position
29 off-centre support position
30 initial position
31 vertical central axis
32 end position
33 first inclination direction
34 transverse axis
35 second inclination direction
36 first guide element
37 second guide element
38 tube element
39 sectional drawings
40 holding device
41 holding sheet metal element
42 first holding guide element
43 second holding guide element
44 third holding guide element
45 displacement direction
50 shared vertical plane
51 vertical parallel plane
52 first axial offset
53 first angle of inclination
54 first intermediate position
55 larger axial offset
56 second intermediate position
57 larger angle of inclination
58 maximum axial offset
59 maximum angle of inclination
70 driver torso support device
126 alternative guide device
126B first end
126C second end
180 first rod element
181 second rod element

What is claimed is:

1. A vehicle seat, in particular a utility motor vehicle seat, comprising:
    a seat part comprising:
        a backrest that includes a lower backrest part positioned below an upper backrest part; and
        a holding device to which the upper backrest part is mounted such that the upper backrest part is displaceable relative to the lower backrest part, wherein the holding device comprises a guide device which enables the upper backrest part to laterally displace along a displacement curve towards at least one side edge of the lower backrest part, wherein the guide device comprises a first guide element which is arranged above and at a distance from a second guide element, wherein the first guide element forms a first curved path and the second guide element forms a second curved path, and wherein the first and the second curved paths are arranged with an axial offset that increases from a first end of the first and second guide elements to a second end of the first and second guide elements along the displacement curve, causing the upper backrest part to rotate about a substantially horizontal axis during the lateral displacement.

2. The vehicle seat according to claim 1, wherein the substantially horizontal axis is transverse to the displacement curve.

3. The vehicle seat according to claim 1, wherein the guide device is configured helically at least in part and comprises one or more guide elements which are arranged extending helically around the displacement curve.

4. The vehicle seat according to claim 1, wherein the guide device comprises a holding element having at least one of a slide bearing and a roller bearing.

5. The vehicle seat according to claim 4, wherein the guide device comprises at least one of a rod element and a tube element which is arranged inside the upper backrest part and is received in the at least one of a slide bearing and a roller bearing in the holding element.

6. The vehicle seat according to claim 1, wherein the guide device comprises sliding bearing elements and/or roller bearing elements which are arranged on the lower backrest part and on which rod and/or tube elements are guided in a transverse manner to the primary seating direction.

7. The vehicle seat according to claim 1, wherein the displacement curve is arranged extending in a transverse manner to the primary seating direction of the vehicle seat.

8. The vehicle seat according to claim 1, wherein the upper backrest part is a backrest cushion element.

9. The vehicle seat according to claim 1, wherein the upper backrest part is configured as an additional driver torso support device, which can be arranged outside the seat part and the backrest, which can temporarily be arranged at least in part in a support region which is otherwise free from vehicle seat at the level of the region of the upper half of the backrest and laterally off-centre from the backrest, the additional driver torso support device being arranged displaceably from a parked position into an additional support position in the support region which is otherwise free from vehicle seat by means of a displacement device.

10. A utility motor vehicle, in particular an agricultural utility motor vehicle, comprising at least one vehicle seat, characterised by a vehicle seat according to claim 1.

11. A vehicle seat, comprising:
a seat part;
a backrest, including:
   a lower backrest part;
   an upper backrest part;
a holding device connected to the lower backrest part, wherein the upper backrest part is mounted displaceable to the lower backrest part by the holding device, wherein the upper backrest part is linearly displaceable laterally along an imaginary displacement curve past at least one side edge of the lower backrest part while the lower backrest part remains stationary with respect to the seat part, wherein the imaginary displacement curve is arranged in a plane defined by a direction of a lateral extension of the vehicle seat and a direction of a longitudinal extension of the vehicle seat;
a guide device, the guide device including:
   at least first and second guide elements, wherein the first and second guide elements are positioned such that at least a portion of the first guide element is arranged with an axial offset that increases from a first end of the first and second guide elements to a second end of the first and second guide elements; and
a second holding device, wherein the second holding device is mounted to the holding device connected to the lower backrest part, wherein the second holding device is connected to the upper backrest part by the first and second guide elements, wherein the first and second guide elements move with the upper backrest part as the upper backrest part is displaced laterally relative to the lower backrest part, and wherein the guide device defines the imaginary displacement curve.

\* \* \* \* \*